United States Patent [19]

Takamiya et al.

[11] 4,133,012
[45] Jan. 2, 1979

[54] MAGNETIC RECORDING AND REPRODUCING DEVICE

[75] Inventors: Takehisa Takamiya, Hirakata; Yoshiro Yano, Moriguchi; Yuji Nakamura, Neyagawa, all of Japan

[73] Assignee: Matsushita Electric Industrial Co., Ltd., Osaka, Japan

[21] Appl. No.: 726,636

[22] Filed: Sep. 27, 1976

[30] Foreign Application Priority Data

Oct. 3, 1975 [JP] Japan .............................. 50-120173

[51] Int. Cl.² ...................... G11B 15/29; B65H 17/22
[52] U.S. Cl. ...................................... 360/90; 226/187
[58] Field of Search ................... 360/90, 130; 226/181, 226/186, 187, 195

[56] References Cited

U.S. PATENT DOCUMENTS

| 2,676,212 | 4/1954 | Williams | 360/90 |
| 3,137,767 | 6/1964 | Axon et al. | 360/90 |
| 3,326,440 | 6/1967 | Barnes et al. | 360/90 |

Primary Examiner—Robert S. Tupper
Attorney, Agent, or Firm—Burgess, Ryan and Wayne

[57] ABSTRACT

A magnetic recording and reproducing device comprises a capstan rotatable at a constant speed, a rotatable roller, a pair of pinch rollers disposed symmetrically about the bisector or perpendicular erected at the midpoint of the line connecting the centers of the capstan and roller and movable toward the capstan from the opposite direction to be pressed against the same, a head block disposed between the capstan and roller and including a plurality of heads, the capstan and one of the pinch rollers providing first tape transport or drive means while the capstan and the other pinch roller, a second tape transport means being directed toward the roller at which the tape is redirected to be fed to the second tape transport means, the tape being made into contact with the heads of the head block between the first and second film transport means, and the speed of tape imparted thereto by the first tape transport means being slower than the speed of tape imparted thereto by the second tape transport means.

7 Claims, 17 Drawing Figures

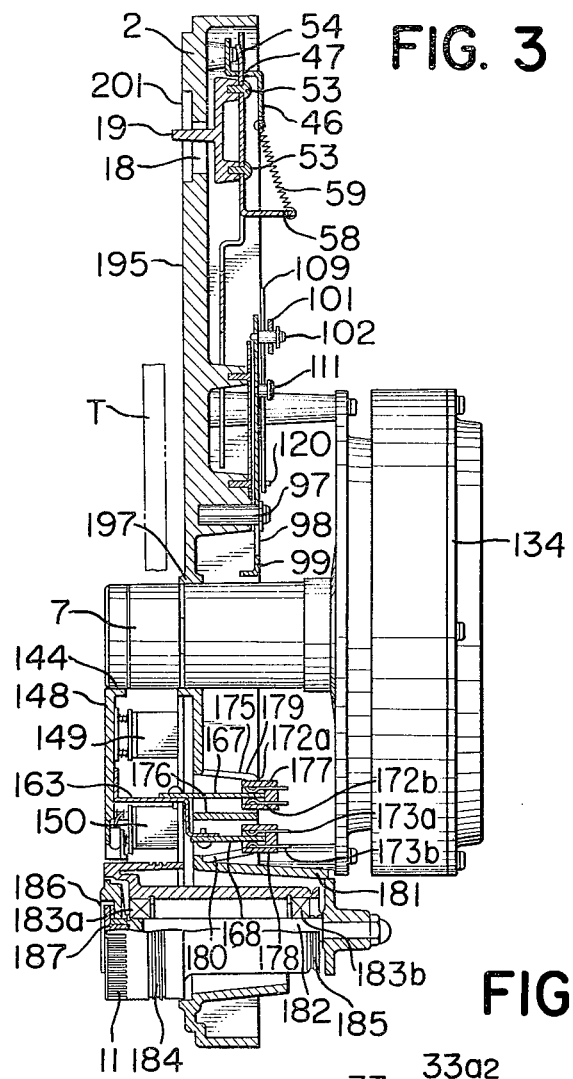
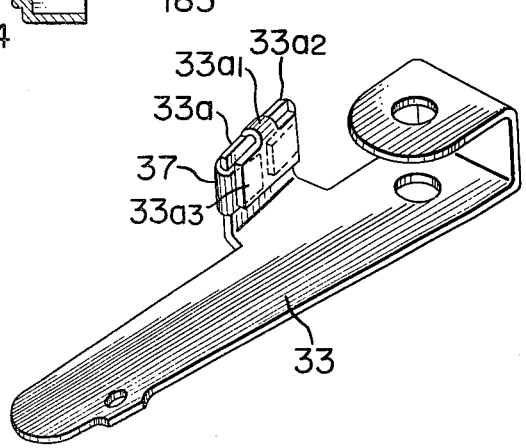

MAGNETIC RECORDING AND REPRODUCING DEVICE

BACKGROUND OF THE INVENTION

The present invention relates to a magnetic recording and reproducing device wherein two tape transport or drive means are provided with a single capstan in such a way that the tape may be made into contact with the heads with the optimum tension between the tape transport means, whereby excellent performance may be ensured.

Of various magnetic recording and reproducing systems using magnetic tapes, the so-called open reel systems have been widely used for excellent performance and high fidelity recording and reproduction. In the open reel systems, the tape is unwound from one of two reels mounted on the turntables, transported at relatively high constant speeds such as 38 cm/sec or 19 cm/sec. The open reel systems have been widely used in studios for broadcasting purpose and their excellent performance has been well known to those skilled in the art. In the past much efforts have been made to transport the tape at accurately a constant speed as possible in order to minimize wow and flutter so that the conventional open reel type magnetic recording and reproducing devices are very complex especially in a mechanism for transporting the tape at a constant speed.

SUMMARY OF THE INVENTION

In view of the above, one of the objects of the present invention is to provide a magnetic recording and reproducing device which has only one capstan which provides two film transport means together with a pair of pinch rollers so that the tape may be pressed against the head with the optimum tension between the two transport means, whereby the mechanism is much simplified and made compact in size and excellent performance may be ensured.

Another object of the present invention is to provide a magnetic recording and reproducing device of the type described and wherein the tape transported by one of the tape transport means is made into contact with the heads arrayed on one lateral side of the head block and is redirected through substantially 180° by a roller to be made in contact with the heads on the other lateral side of the head block and be fed to the other tape transport means, and the height of the tape which is being transported between the tape transport means is controlled so that the smooth film transport may be ensured and may be free from the adverse effects due to the inclination of the capstan and roller.

A further object of the present invention is to provide a magnetic recording and reproducing device wherein the front panel is most effectively utilized so that the magnetic recording and reproducing device may be made very compact in size and the tape threading may be much facilitated.

A further object of the present invention is to provide a magnetic recording and reproducing device wherein the displacement of tape shifter pins may be controlled by simple means with small force and the tape may be spaced apart from the heads by a safe distance in case of fast-forward or rewind mode.

A further object of the present invention is to provide a magnetic recording and reproducing device wherein each of a plurality heads may be mounted on a base head in a simple manner so that the assembly of the heads may be much facilitated.

To the above and other ends, the present invention provides a magnetic recording and reproducing device comprising a capstan rotatable at a constant speed, a roller, a pair of pinch rollers disposed symmetrical about the bisector or perpendicular erected at the midpoint of the line connecting the centers of the capstan and roller and movable toward the capstan from the opposite directions to be pressed against is, a head block disposed between the capstan and roller and including a plurality of heads, the capstan and one of the pinch rollers providing first tape transport means while the capstan and the other pinch roller, a second tape transport means, the tape which is transported by the first tape transport means being made into contact with the heads arrayed on one lateral side of the head block and being redirected by the roller substantially 180° to be made into contact with the heads arrayed on the other lateral side of the head block and be fed into the second tape transport means, and the speed of tape imparted by the first tape transport means being slower than the speed of tape imparted by the second tape transport means in such a way that their ratio n may be $0.997 \leq n \leq 1$.

BRIEF DESCRIPTION OF THE ACCOMPANYING DRAWINGS

FIG. 3 is a side view, partly in section, taken substantially along the line 3—3 of FIG. 1;

FIG. 4 is a perspective view of a brake lever;

DESCRIPTION OF THE PREFERRED EMBODIMENT

Figure 1:
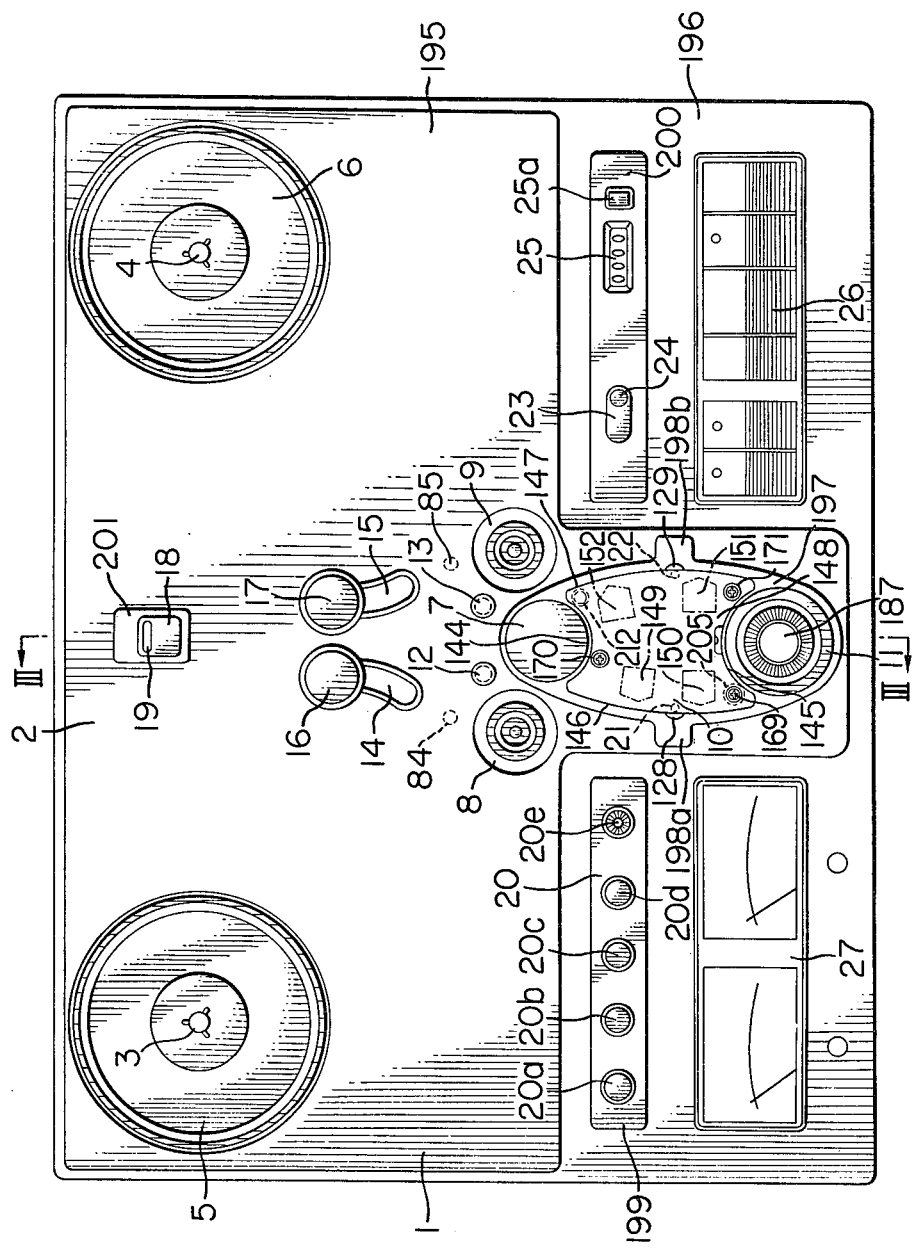
FIG. 1 is a front view of one preferred embodiment of the present invention.

Mounted on a rectangular front panel 2 of a box-shaped main body 1 of a tape recorder are turntables 5 and 6 formed integral with spindles 3 and 4 and a capstan 7 on the bisector or perpendicular erected at the mid-point of the line connecting between the centers of the spindles 3 and 4. Two pinch rollers 8 and 9 are disposed on both sides of the capstan 7 in symmetrical relation about the capstan 7, and a headblock 10 is disposed immediately below the capstan 7 and on the bisector. A roller 11 with a height substantially equal to that of the capstan 7 is disposed below the head block 10.

Two guide pins 12 and 13 are positioned between the pinch rollers 8 and 9 and slightly above the capstan 7, and two tension rollers 16 and 17 are extended through elongaged slots 14 and 15 which are symmetrical about the bisector and are diverged downwardly so that the tension rollers 16 and 17 are movable in the slots for adjusting the height of the tape. A tension roller operating knob 19, which is disposed on the bisector above the tension rollers 16 and 17, is not only vertically but upwardly and downwardly movable in the hole 18.

Mounted on the left of the head block 10; that is, on the left lower portion of the panel 2 is a control panel including an on-off switch, a tape transport direction changeover switch and so on, and disposed on the right side of the head block 20 is a tape shifter pin operating knob 24 for movement in the elongated slot 23 formed through the panel 2 not only in the vertical direction but in the transverse direction for displacing one (22) of two tape shifter pins 21 and 22 disposed within the head block 10. A tape counter 25 is disposed on the right side of the operating knob 24, and a mode selection control panel 26 is disposed below the operating knob 24 and the tape counter 25.

Figure 2:
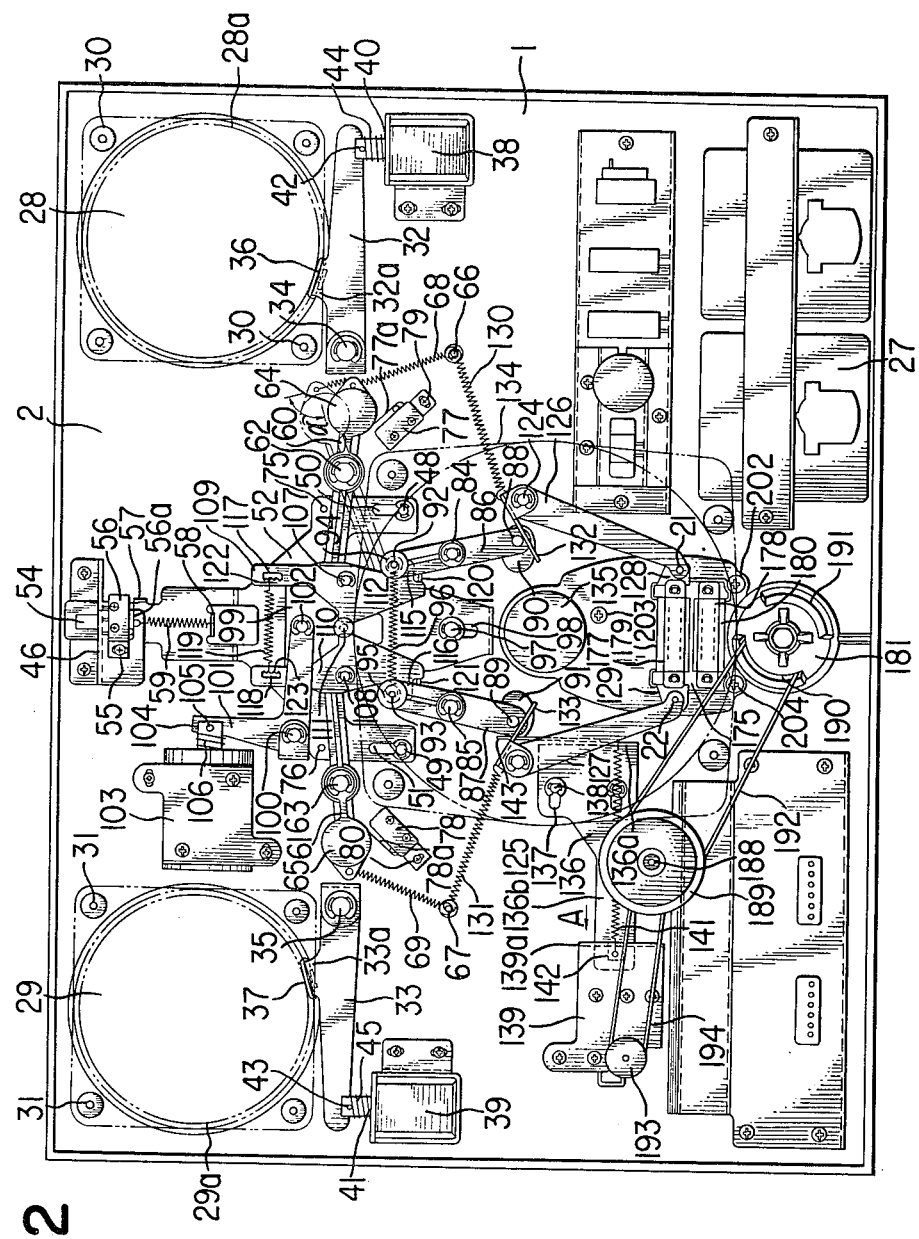
FIG. 2 is a rear view thereof.

Referring to FIG. 2, reel motors 28 and 29 are mounted on the panel 2 with screws 30 and 31, and a brake lever 32 or 33 has its one end pivoted to the panel 2 with a pin 34 or 35 and has a projection 32a or 33a extended from the midpoint thereof and provided with a brake shoe 36 or 37 made of leather or felt. The other end of the brake lever 32 or 33 is connected with a pin 42 or 43 to the plunger 40 or 41 of a brake release solenoid and plunger assembly 38 or 39. When the motor 28 or 29 is stopped the brake lever 32 or 33 is biased by a return spring 44 or 45 so that the brake shoe 36 or 37 is pressed against the rotor 28a or 29a of the motor 28 or 29, thereby supplying a brake action to the turntable 5 or 6.

The detail of the brake lever 33 is shown in FIG. 4. The projection 33a is formed in the shape of H with a bend portion 33a1. To attach the brake shoe 37, it is wrapped around the lower projection 33a2 and securely bonded thereto with a suitable adhesive, and then the upper projection 33a3 is folded back about the bend portion 33a1 over the brake shoe 37, whereby the latter may be securely held in position. The construction of the brake lever 32 and the method for securing the brake shoe 36 to the projection 32a are substantially similar to those described above.

The tension roller operating knob 19 is connected with screws 53 to a Y-shaped sliding plate 62 whose upper end is slidably fitted into a hole 47 of a guide plate 46 (See FIG. 3) mounted on the panel and whose arms have elongated holes 50 and 51 fitted over guide pins 48 and 49 extended from the panel 2 so that the sliding plate 52 may be vertically movable. A forwardly bent locking member 54 is struck out of the upper end of the sliding plate 52, and a projection 57 for engagement with an actuating member 66a of a switch 56 mounted on the guide plate 46 with screws 55 is extended from the sliding plate 52 below the locking member 54.

A spring 59 is loaded between the guide plate 46 and a projection 58 of the sliding plate 52 and the guide plate 46, and the projection 58 is disposed backwardly of the 46 so that the sliding plate 52 is normally biased upwardly as well as forwardly.

A tension lever 60 or 61 is pivoted with a pin 62 or 63 to the panel 2 and has the tension roller 16 or 17 rotatably mounted on the inner free end and a balance weight mounted on the outer free end. The tension lever 60 and the balance weight 64 or 65 are formed integrally by die-casting or sintering in such a way that when the tension lever 60 or 61 is assembled, the static equilibrium or balance may be attained about the pivot 62 or 63 between the balance weight 64 or 65 and the tension roller 16 or 17.

Figure 5:
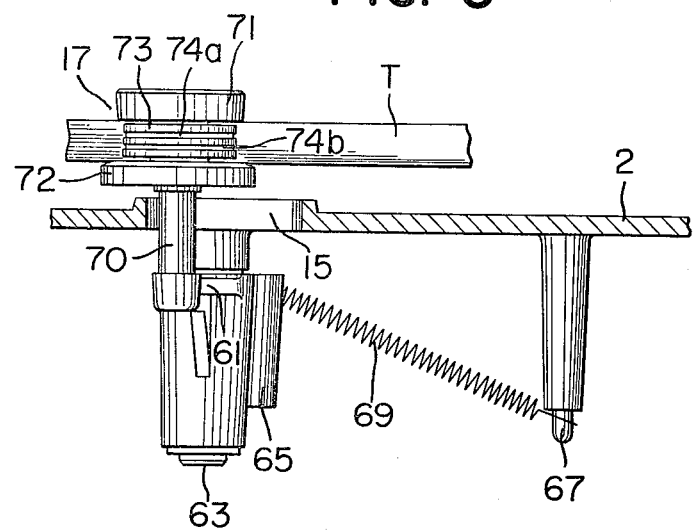
FIG. 5 is a side view of a tension roller and its associated parts.

The tension roller 16 or 17 is shown in detail in FIG. 5. The tension roller 17 is attached to the upper end of a shaft 70 extended from the inner end of the tension lever 61, and flanges 71 and 72 for controlling the height of the tape T are formed integral with the shaft 70 and are vertically spaced apart from each other. A roller 73 is rotatably carried by the shaft 70 between the upper and lower flanges 71 and 72 for contact with the tape T. The roller 73 has circumferential grooves 74a and 74b so that the air may be trapped between these grooves 74a and 74b and the tape T, thereby preventing the nonuniform winding of the tape around the reel due to the vibration of the tape especially in case of the high-speed transport of the tape T. The tension roller 16 is substantially similar in construction to the tension roller 17.

A spring 68 or 69 is loaded between the outer end of the tension lever 60 or 61 and a pin 66 or 67 extended from the panel 2 so that the tension lever 60 is biased in the clockwise direction in FIG. 2 while the tension lever 61, in the counterclockwise direction. In the stop mode the tension roller 16 or 17 is positioned at the upper end of the elongated slot 14 or 15.

Still referring to FIG. 5, the pin 66 or 67 is positioned backwardly of the tension lever 60 or 61 with respect to the surface of the panel 2 so that the tension lever 60 or 61 is also biased in the perpendicular direction relative to the direction of rotation so that the play in the thrust direction of the shaft 62 or 63 may be eliminated and consequently the play of the tension roller 16 or 17 in the perpendicular direction relative to the surface of the panel 2 may be eliminated. That is, the height of the tape T being transported may be prevented from being varied due to the play in the thrust direction of the tension roller 16 or 17.

Figure 13:
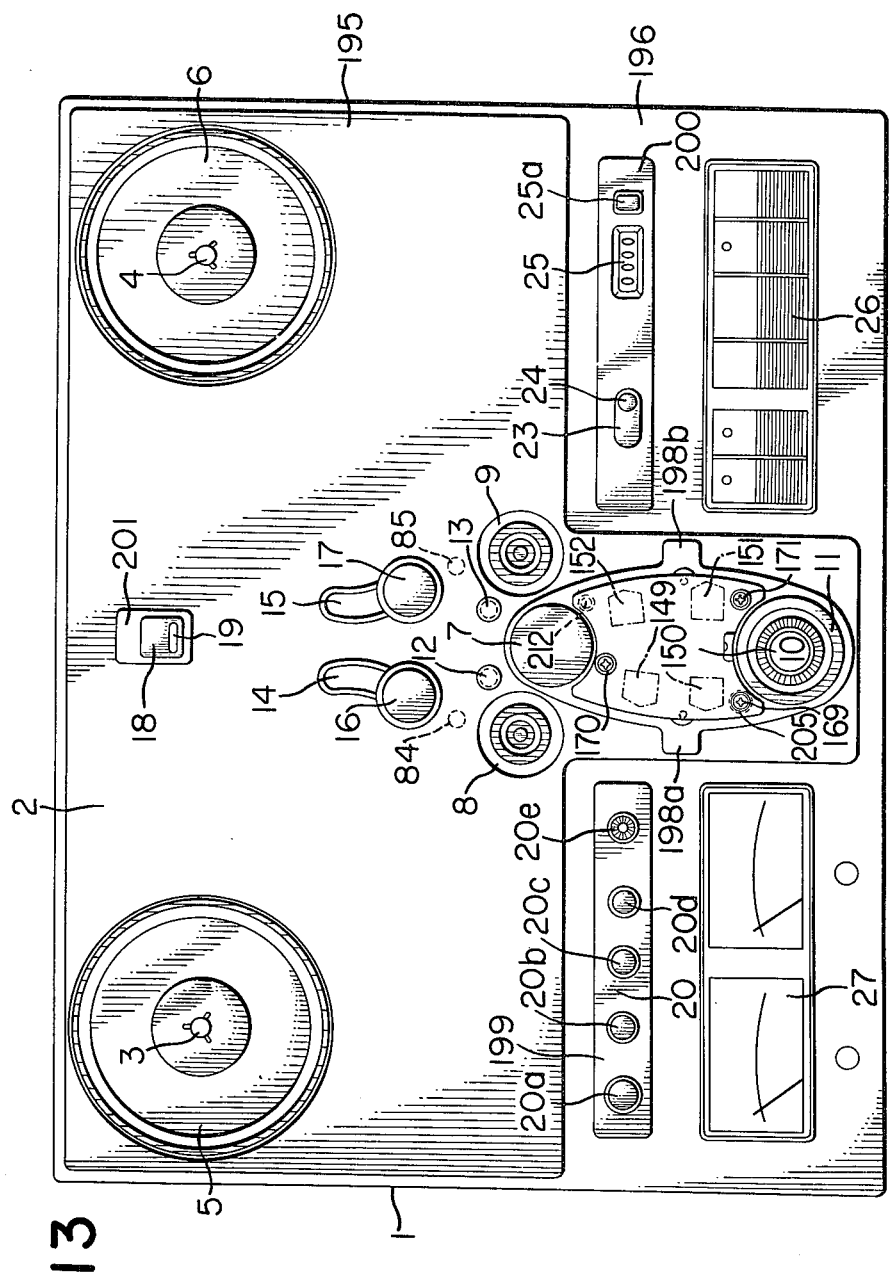
FIG. 13 is a front view illustrating tension rollers displaced.

Referring back to FIG. 2, pins 75 and 76 are extended from the slide plate 52 in opposed relation with the tension levers 60 and 61, respectively, and when the sliding plate 52 is forced downwardly against the spring 59, the pins 75 and 76 cause the tension levers 60 and 61 to rotate in the clockwise and counterclockwise directions, respectively, against the springs 68 and 69 to the lowermost position in the elongated slots 14 and 15 which control the stroke of the tension rollers 16 and 17 as shown in FIG. 13. In this state, the locking member 54 of the sliding plate 52 is made into engagement with the edge of the hole 47 of the guide plate 46 so that the tension rollers 16 and 17 are held in the locked position.

When the tension roller 16 or 17 is displaced to the lowermost position in the elongated slot 14 or 15, the line connecting between the center of the pin 62 or 63 and one end of the spring 68 or 69 attached to the tension lever 60 or 61 and the line connecting between the pin 66 or 67 and one end of the spring 68 or 69 make an angle substantially equal to 90° as shown in FIG. 2.

A switch 77 or 78 which is mounted on the panel 2 with a screw 79 or 80 has an actuating member 77a or 78a which is actuated by the balance weight 64 or 65 of the tension lever 60 or 61. When the tension roller 16 or 17 is placed in the upper end of the elongated slot 14 or 15 as shown in FIG. 1, the balance weight 64 or 65 engages with the actuating member 77a or 78a so that the switch 77 or 78 is opened, but when the tension roller 16 or 17 is slightly moved downwardly, the switch 77 or 78 is closed.

Figure 12:
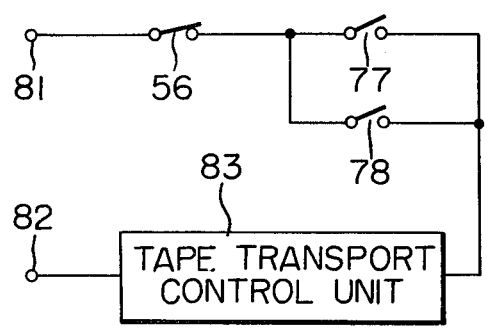
FIG. 12 is a diagram of an electric control circuit.

As shown in FIG. 12, the switches 77 and 78 are connected in parallel and interconnected between the switch 56 which in turn is connected to one terminal 81 of power supply and a tape transport control unit 83 which in turn is connected to the other terminal 82 of power supply. The switch 56 is closed when the sliding plate 52 is displaced upwardly as shown in FIG. 2; that is, in the rest mode, but the switch 56 is opened when the sliding plate 52 is slightly moved downwardly from the upper position.

The pinch roller 8 or 9 is rotatably mounted with a shaft 88 or 89 to the lower end of a pinch roller lever 86 or 87 which in turn is pivoted at the mid-point thereof to the panel 2 with a pin 84 or 85, and the shaft 88 or 89 is extended through a hole 90 or 91 formed through the panel 2 for displacement therein.

A roller 94 or 95 is rotatably mounted with a shaft 92 or 93 to the upper end of the pinch roller lever 86 or 87, and a spring 96 is loaded between the shafts 92 and 93.

A drive plate 99 has an elongated slot 98 into which is fitted a pin 97 extended from the panel 2 so that the drive plate 99 may be vertically slidable. An L-shaped lever 101 is pivoted with a pin 100 to the panel 2 and has its one end pivoted with a pin 102 to the upper end of the drive plate 99. The other end of the lever 101 is connected with a pin 105 to the plunger 104 of a solenoid and plunger 103 mounted on the panel 2 for driving the pinch roller. A spring 106 is fitted over the plunger 104 for biasing the drive plate 99 downwardly through the lever 101. In the normal state, the drive plate is held in the lowermost end of its stroke.

Actuating levers 109 and 110 have their centers pivoted with pins 107 and 108 to the center portion of the drive plate 99 and have their projections fitted into a groove 112 of a pin extended from the center of the drive plate 99 so that the actuating levers 109 and 110 may be prevented from moving away from the drive plate 99.

A projection 115 or 116 with an inclined upper side 113 or 114 is extended from the lower outer side of the actuating lever 109 or 110 and is pressed against the roller 94 or 95 of the pinch roller lever 86 or 87.

Figure 6:
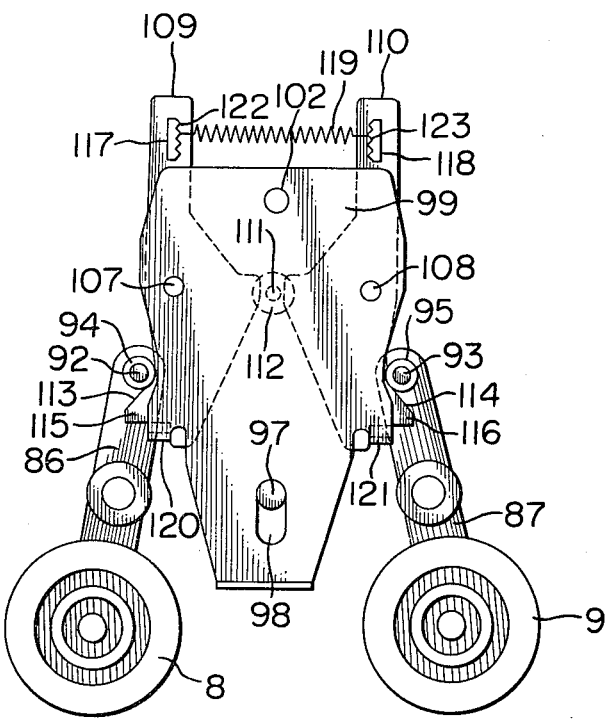
FIG. 6 is a front view of a pair of pinch rollers and their associated parts.

Loaded between the holes 117 and 118 formed at the upper ends of the actuating levers 109 and 110 is a spring 119 which has a considerably stronger force than the spring 98 so that the actuating lever 110 is biased in the clockwise direction in FIG. 6 while the actuating lever 110, in the counterclockwise direction. The rotation of the actuating lever 109 or 110 is limited by the engagement between the lower outer side of the actuating lever 109 or 110 with a projection 120 or 121 extended from the drive plate 99. The inner side of the hole 117 or 118 is formed with a plurality of recesses 122 or 123 in such a way that the distance between the pin 106 or 107 and the end of the spring 109 may be varied, whereby the fine adjustment of the pressure difference between the pinch rollers 8 and 9 due to the dimmensional errors of the components.

The tape shifter pin 21 or 22 is attached to one end of a shifter lever 126 or 127 having the other end pivoted with a pin 124 or 125 to the panel 2. The tape shifter pin 21 or 22 is extended through a hole 128 or 129 formed through the panel 2. The shifter lever 126 is biased in the clockwise direction by a spring 130 loaded between the lever 126 and the pin 66 while the shifter lever 127 is biased in the counterclockwise direction by a spring 131 loaded between the lever 127 and the pin 67.

A projection 132 or 133 extended from the shifter lever 126 or 127 is pressed against the shaft 88 or 89 of the pinch roller lever 86 or 87 in the direction substantially in line with the line connecting the shaft 84 or 85 and the point of contact between the shaft 88 or 89 and the projection 132 or 133. In the normal state, the shaft 88 or 89 presses the projection 132 or 133 so that the shifter levers 126 and 127 are rotated in the counterclockwise direction and the clockwise direction, respectively, against the springs 130 and 131, whereby the shifter pins 21 and 22 are spaced apart from each other.

Referring to FIGS. 2 and 3, the capstan 7 is formed integral with the rotor of a capstan driving motor 134 and is extended through a hole 135 formed through the panel 2.

Figure 7:
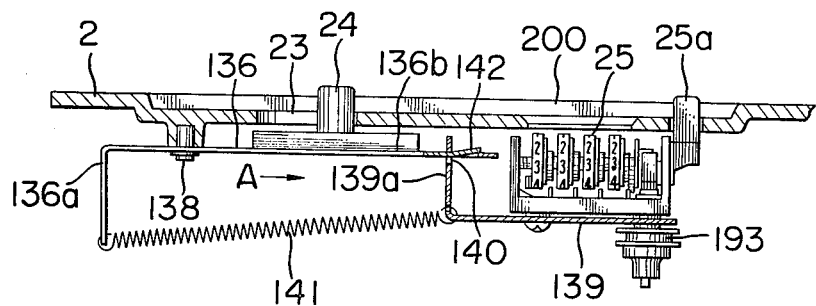
FIG. 7 is a side view, partly in section, of a pinch roller actuating means.

Referring to FIGS. 2 and 7, the tape shifter operating knob 24 is attached to a sliding lever 136 which is slidable to the left or right guided by a pin 138 extended from the panel 2 and fitted into an elongated slot 137 of the sliding lever 136 and a guide hole formed through the vertical arm 139a of an angle 139 upon which is mounted the tape counter 25. The sliding lever 136 is normally biased in the direction A by a spring 141 loaded between a projection 136a of the lever 136 and the angle 139, and the projection 136a is placed backwardly of the angle 139 so that the arm 136b upon which is attached the operating knob 24 is biased forwardly so that the arm 136b is pressed against the edge of the hole 140. The free end of the arm 136b of the sliding lever 136 is terminated into a forwardly inclined locking member 142 which engages with the circumferential edge of the hole 140 when the knob 24 is displaced in the direction opposite to the direction A so that the sliding lever 136 may remain in the position to which the lever 136 has been displaced.

One end of an elastic plate 143 is connected to the sliding lever 136 and the other end is made into contact with the pinch roller 87 in the normal state so that when the sliding lever 136 is displaced in the direction opposite to the direction A, the elastic plate 143 causes the pinch roller lever 87 to rotate against the spring 96 in the counterclockwise direction in FIG. 2 and consequently the pinch roller 9 is moved toward the capstan 7 and the tape shifter lever 127 is rotated in the counterclockwise direction in FIG. 2 under the force of the spring 131, thereby displacing the tape shifter pin 22 inwardly. However, the pinch roller 9 is not sufficiently moved toward the capstan 9 by the displacement of the sliding lever 136 so that the tape T is not pressed against the capstan 7.

Figure 11:
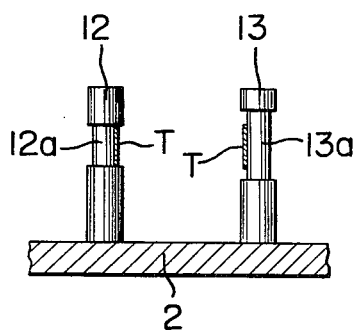
FIG. 11 is a side view, partly in section, of tape guide pins.

Referring to FIG. 11, the tape guide pin 12 or 13 is formed with a small diameter guide portion 12a or 13a, and the width or vertical height of the tape guide portion 12a of the guide pin 12 is substantially equal to the width of the tape so that the height of the tape being transported may be controlled. The height of the tape guide portion 13a of the guide pin 13 is larger than the tape width so that the guide pin 13 accomplishes only the traveling guide of the tape.

Figure 8:
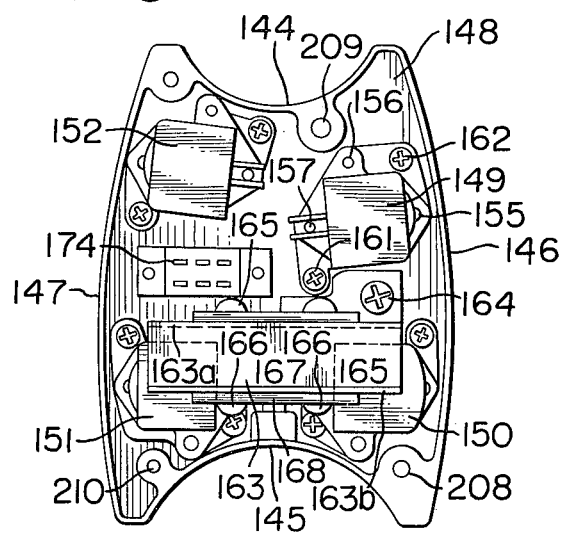
FIG. 8 is a rear view of a head block.

Next referring to FIG. 8, the head block 10 will be described in detail. The head block 10 has a base plate 148 with an arcuate upper side 144 spaced apart from the periphery of the capstan 7 by a very small distance, the arcuate lower side 145 spaced apart from the roller 11 by a very small distance and arcuate lateral sides extending slight outwardly beyond the arcuate tape transport paths for covering the tape being transported. Mounted on the back surface of the base plate 148 are mounted four heads; that is, a four track reproducing head 149, two-track erase head 150, two-track recording head and a two-track reproducing head 152 in such a way that they are positioned at the vertexes of a square between the capstan 7 and the roller 11.

Figure 9:
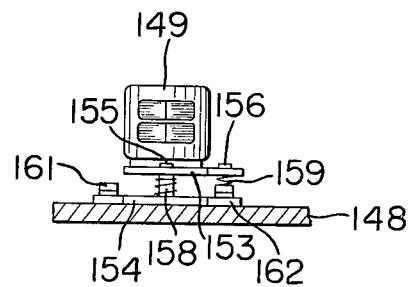
FIG. 9 is a front view of a head and its mounting means.

The mounting of these heads 149 to 152 is substantially similar as shown in FIG. 9. That is, a head base 153 formed integral with the head 149 is mounted on a head mount 154 with screws 155, 156 and 157 (which is not shown) and springs 158, 159 and 160 (which is not shown) fitted over the screws 155, 156 and 157, respectively, in such a way that the height as well as inclination of the head 149 may be adjusted. The head mount 154 in turn is mounted on the head block base plate 148 with screws 161 and 162.

Since the head base 153 of the head 149 is previously mounted on the head mount 154 with a head inclination adjusting mechanism in the manner described above prior to the mounting of the head mount 154 to the head block base 148, the assembly of the heads may be much facilitated.

A shield plate 163 is mounted on the head block base plate 148 with a screw 164 in order to shield between the four- and two-track reproducing heads 149 and 152 mounted on the upper portion of the head block and the two-track erase and recording heads 150 and 151 disposed at the lower portion of the head block. The shield plate or block 163 is inverted U-shaped in cross section; that is, it has an upright portion 163a contiguous with a flat portion in parallel with the base plate 148 and the upright portion 163b directed toward the heads 150 and 151. Printed circuit boards 167 and 168 are attached to the upright portions 163a and 163b, respectively, with screws 165 and 166. Disposed at the center of the back surface of the base plate 148 is a changeover switch 174 for selecting the four-track or two-track reproducing head 148 or 149, and a tape guide pin 212 is extended downwardly from the right corner (looking from the front surface of the base plate 148).

Figure 10:
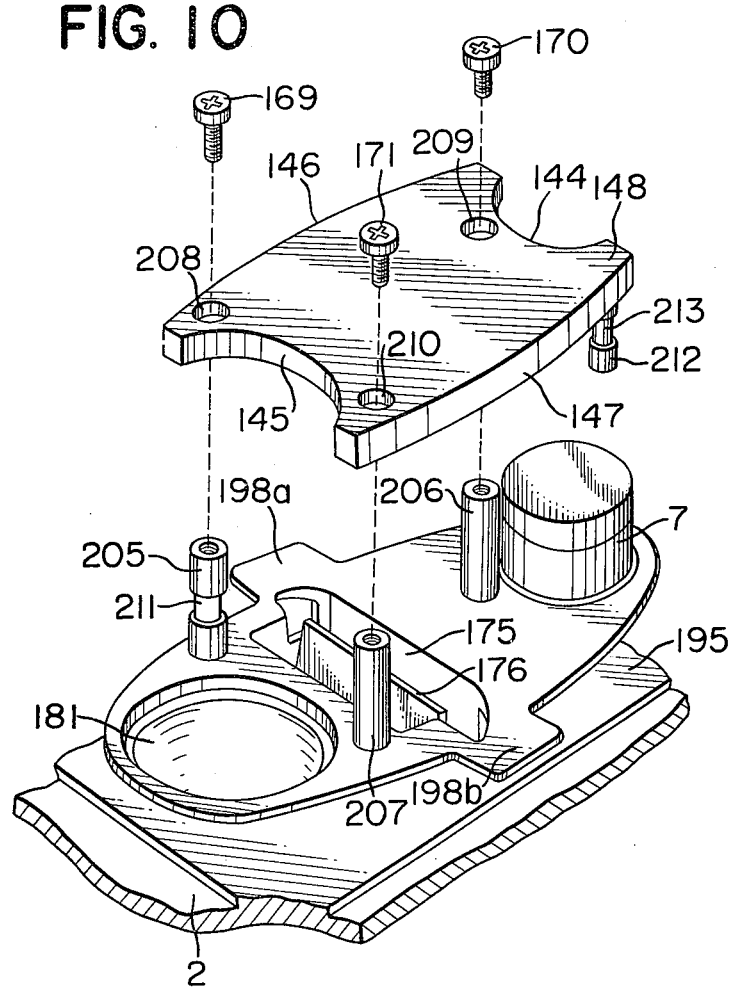
FIG. 10 is a perspective exploded view of a head block assembly.

The head block 10 with the above construction is supported by three columns 205, 206 and 207 passed through holes 208, 209 and 210 with screws 169, 170 and 171 screwed into the upper screw holes of the columns 205, 206 and 207 respectively, and the columns in turn are mounted on the panel 2 and secured thereto with screws 202, 203 and 204 (See FIG. 2), so that the upper arcuate side 144 of the base plate 148 is slightly spaced apart from the lower half of the periphery of the capstan 7 and the lower arcuate side 145 is spaced slightly from the upper half of the periphery of the roller 11 and the top surface of the base plate 148 is coplanar with the tops of the capstan 7 and the roller 11. As shown in FIG. 10, the column 205 has a guide portion 211 or reduced diameter portion with a height substantially equal to the width of the tape so that the tape is transported from the head 150 to the roller 11 is made into contact with the guide portion 211 and guided thereby, whereby the height of the tape being transported may be controlled. The guide pin 212 extended from the base plate 148 is also formed with a reduced diameter portion or guide portion 213 with a height substantially equal to the width of the tape so that the tape which is transported from the head 152 to the capstan 7 may be made into contact with and guided by the guide portion 213, whereby the height of the tape being transported may be controlled.

As shown in FIG. 3, the printed circuit board 167 is clamped by and electrically connected to a pair of terminals 172a and 172b extended from the main body 1 when the head block 10 is mounted on the panel 2, and in like manner the printed circuit board 168 is clamped to and electrically connected to a pair of terminals 173a and 173b. The printed circuit boards 167 and 168 are disposed with a recess 175 of the panel 2 and is shielded from each other by a shielding extension 176 extended from the bottom of the recess 175 between the printed circuit boards 167 and 168. That is, the reproduction printed circuit board 167 with terminals 172a and 172b are shielded from the printed circuit board 168 with the terminals 173a and 173b through which the bias current flows in the case of recording. The terminals 172a and 172b and 173a and 173b are formed integral with terminal boxes 177 and 178, respectively, which are inserted into the recess 175.

Referring to FIGS. 3 and 10, the shaft 182 of the roller 11 which does not control the height of the tape being transported is rotatably supported in a recess 181 extending from the rear surface of the panel between a spaced apart bearings 183a 183b, and the periphery of the roller 11 which guides the tape is formed with a plurality of fine grooves or slots. The roller 11 is also formed with a belt wrapping portion 185 at the lower portion thereof, and a non-rotary member 187 is fitted into a recess 186 formed in the top of the roller 11.

As best shown in FIG. 2, two diametrically opposed arcuate elongated slots 190 and 191 are formed through the bottom of the recess 181, and an endless belt 190 is wrapped around a pulley 189 rotatably carried by a shaft 188 extended from the panel 2 and the belt wrapping portion 185 of the roller 11 and is extended through one arcuate elongated slot 190. Another endless belt 194 is extended between a small-diameter pulley formed integral with the pulley 189 and a pulley 193 of the tape counter 25 so that upon rotation of the roller 11 the tape counter 25 may be driven.

Next referring back to FIG. 1, the upper surface of the panel 2 and various components mounted thereon will be described. The first front panel surface 195 upon which are mounted the turntables 5 and 6, the tension rollers 16 and 17, the tape guide pins 12 and 13, the capstan 7, the pinch rollers 8 and 9, the head block 10 and the roller 11 and which substantially define the path of the tape is slightly raised with respect to the second front panel surface 196 upon which are disposed the control unit 20, the tape shifter operating knob 24, the tape counter 25, the mode selection unit 26 and a level member 27. The third front panel surface 197 through which are disposed the capstan 7, the head block 10 and the roller 11 is further raised with respect to the second front panel surface 196 and is extended beyond the path of the tape. The third front panel surface 197 further includes are sections 198a and 198b extended laterally from the mid-points of the lateral sides and in opposed relation with the shifter pins 21 and 22.

The control panel 20, the tape shifter operating knob 24 and the tape counter 25 and the tape tension roller operating knob 19 are disposed in recesses 199, 200 and 201, respectively, and control knob 20a, 20b, 20c, 20d and 20e of the control panel 20, the tape shifter pin operating knob 24, the tape counter reset knob 25a and the tension roller operating knob 19 are extended through the bottoms of these recesses 199, 200 and 201.

The level meter panel 27 and the mode selection panel 26 are substantially coplanar with the second front panel surface 196 and are below the plane on which the tape is transported.

Next the mode of operation of the preferred embodiment with the above construction will be described. In non-play or stop mode, as shown in FIGS. 1 and 2, the brake shoes 36 and 37 are pressed against the rotors 28a and 29a of the reel motors under the forces of the springs 44 and 46. The tension rollers 16 and 17 are held in the upper ends of the elongated slots 14 and 15 under the forces of the springs 68 and 69 so that the switches 77 and 78 are opened while the switch 56 is closed. Therefore, even when the mode selection panel 26 is operated, the tape transport control unit 83 is not energized.

The pinch rollers 8 and 9 are biased outwardly and equally under the force of the spring 96 and are moved away from the capstan 7. Therefore, the tape shifter pins 21 and 22 are displaced outwardly under the forces of the springs 130 and 131.

Prior to the threading of the tape, the tension roller operating knob 19 is displaced downwardly against the spring 59 so that the tension sliding plate 52 is displaced downwardly and consequently the pins 75 and 76 are made into engagement with the tension levers 60 and 61, respectively, to cause them to rotate in the counterclockwise and clockwise directions, respectively, in FIG. 2. As a result, as shown in FIG. 13, the tension rollers 16 and 17 are displaced downwardly along the elongated slots 14 and 15 and are spaced apart from each other so that the easy threading of the tape may be ensured. The tension rollers 16 and 17 are held in the lower position by the engagement of the locking member 54 of the sliding plate 52 with the front edge of the hole 47 formed through the guide plate 45.

When the sliding plate 52 is started to be displaced downwardly the switch 56 is opened, and when the rotation of the tension levers 60 and 61 in the counterclockwise and clockwise directions, respectively, is started, the switches 77 and 78 are closed. Therefore, the tape transport control unit 83 is still remained de-energized.

After the tension rollers 16 and 17 have been displaced in the manner described above, the reels $R_1$ and $R_2$ are mounted on the turntables 5 and 6. It is assumed that the tape T be wound around the reel $R_1$. Then, the leading end of the tape T is extended from the reel $R_1$ to pass over the tension roller 16 and then to pass between the tape guide pins 12 to 13 to be wrapped around the tape guide portion 12a of the guide pin 12. Thereafter, the tape is passed between the capstan 7 and the pinch roller 8 and threaded along the left side of the head block 10 passing over the tape guide portions 211 of the column 205 and extended along the right side of the head block 10 and passed over the guide portion 213 of the tape guide pin 212 and extended between the capstan 7 and the pinch roller 9.

Thereafter, the tape is passed over the tape guide portion 13a of the tape guide pin 13 and extended between the tension rollers 16 and 17 passing over the roller of the tension roller 17 and finally wound around the take-up reel $R_2$.

After the tape has been threaded in the manner described above, the operator rotates with hands the reels $R_1$ and $R_2$ against the braking forces applied to the turntables 5 and 6 to eliminate the slack of the tape between the reel $R_1$ and the tension roller 16 and between the tension roller 17 and the reel $R_2$ or between the tension rollers 16 and 17. Thus, the tape is correctly threaded over the tension rollers 16 and 17, the tape guide pins 12, 13 and 212, the tape guide portion 211 of the column 205 and the roller 11.

Thereafter, the tension roller operating knob 19 is pressed backwardly to release the sliding plate 52. More particularly, when the operating knob 19 is pressed backwardly, the upper end of the sliding plate 52 is displaced backwardly against the force of the spring 59 so that the leading end of the locking member 54 is released from the edge of the opening 47 and consequently the sliding plate 52 is returned to the upper position under the returning force of the spring 59. Thus the sliding plate 52 is returned to the initial position shown in FIGS. 1 and 2.

Upon return of the sliding plate 52 to the initial position, the pins 75 and 76 are released from the tension levers 60 and 61 so that the levers 60 and 61 tend to rotate in the clockwise and counterclockwise directions, respectively, under the returning forces of the springs 68 and 69, respectively, but remain in the same position because the tape T is passed over the tension rollers 16 and 17 which are in the lower position without any slack of the tape T and the brake is applied to the turntables 5 and 6, whereby the upward movement of the tension rollers 16 and 17 may be prevented.

When the sliding plate 52 is released when there is a slight slack in the tape, the tension levers 60 and 61 are rotated under the returning forces of the springs 68 and 69 and the tension rollers 16 and 17 are displaced to the upper ends of the elongated slots 14 and 15. In this case the reels $R_1$ and $R_2$ are so rotated that the tension rollers 16 and 17 are displaced downwardly until at least one of the switches 77 and 78 is switched over. Such readjustment is not required even when the tape is slacked as far as at least one of the tension rollers 16 and 17 has not been displaced to the upper end of the elongated slot 14 or 15.

The control knobs 20a through 20e in the control panel 20, the tape shifter pin operating knob 24, the counter reset knob 25a, the tension roller operating knob 19, the level meter panel 27 and the mode section panel 26 have their tops located below the plane of the transport of the tape T so that the very simple, smooth and positive tape threading may be ensured. During the tape threading, the tension rollers 16 and 17 are displaced downwardly so that they are spaced away from the reels $R_1$ and $R_2$ and from each other so that the tape threading may be further facilitated.

When the tape has been threaded in the manner described above, the tension shifter pins 21 and 22 are placed in the position outwardly of the tape transport path so that the tape T may be prevented from making into contact with any of the heads 149 through 152. Under these conditions, the switch 56 is closed and both or either of the switches 77 and 78 is closed so that the tape control unit 83 may be energized.

Figure 15:
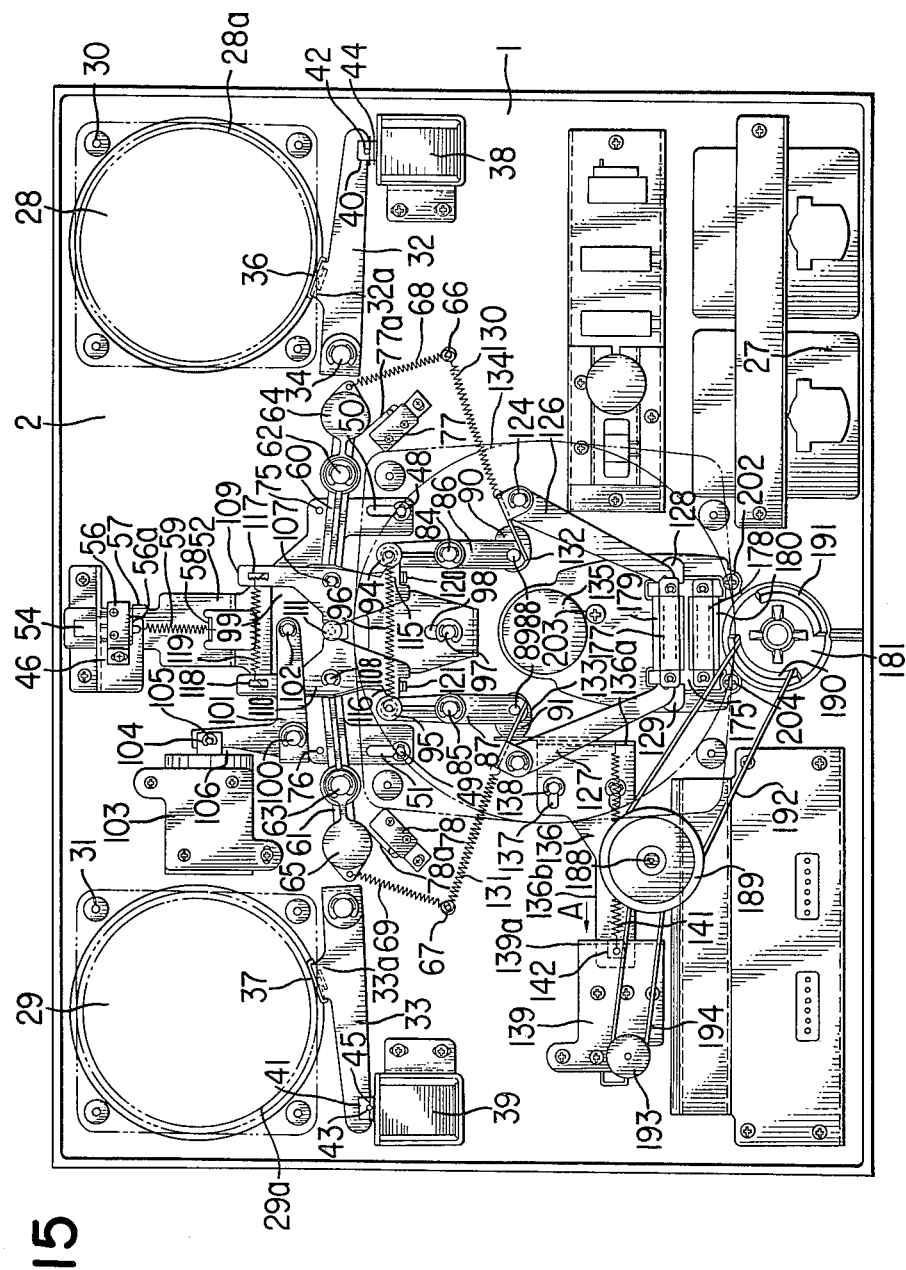
FIG. 15 is a rear view of the device in playback mode.
Figure 16:
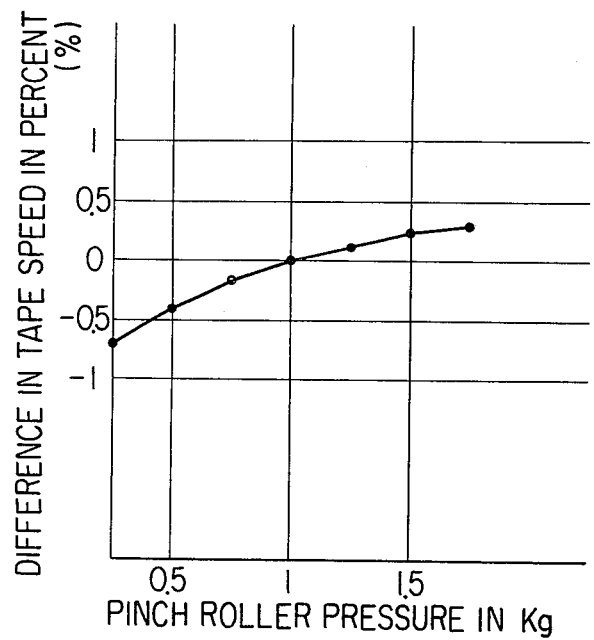
FIG. 16 is a graph illustrating the relation between the variation in tape speed in % and the pressure in Kg under which the pinch rollers are pressed against the capstan.

Next the reproduction or playback mode will be described. Of the mode selection panel 26, a reproduction or playback start button or the like is operated. Then the brake releasing solenoid and plunger assemblies 38 and 39, the solenoid and plunger 103 and the reel motors 28 and 29 are energized. Therefore, the brake levers 32 and 33 are rotated in the clockwise and counterclockwise directions, respectively, against the forces of the springs 44 and 46 to release the brake shoes 36 and 37 away from the rotors 28a and 29a, respectively, of the reel motors 28 and 29 and consequently the turntables 5 and 6. Upon energization of the solenoid and plunger 103, the lever 101 is rotated in the counterclockwise direction as indicated in FIG. 15 so that the drive plate 99 is displaced upwardly.

Upon displacement of the drive plate 99 in the upward direction, the actuating levers 109 and 110 are also displaced upward so that the rollers 94 and 95 of the pinch roller levers 86 and 87 ride on the inclined sides 113 and 114, respectively, of the projections 115 and 116. As a result, the pinch roller lever 86 is rotated in the counterclockwise direction while the pinch roller lever 87, in the clockwise direction in FIG. 2 so that the pinch rollers 8 and 9 press the tape T against the capstan 7 which is rotating.

Even after the pinch rollers 8 and 9 pressed the tape T against the capstan 7, the upward displacement of the actuating levers 109 and 110 together with the drive plate 99 is continued so that the further rotation of the pinch roller levers 86 and 87 may be permited. Therefore, the difference between the force of the spring 119 and the force of the spring 96 acts as the pressure for pressing the pinch rollers 8 and 9 against the capstan 7, and the pressing forces of the pinch rollers 8 and 9 are substantially equal.

Upon rotation of the pinch rollers 86 and 87, the shifter levers 126 and 127 are released and are rotated in the clockwise and counterclockwise directions, respectively, under the forces of the springs 130 and 131, respectively, so that the shifter pins 21 and 22 are moved toward each other. Therefore, the tape T which has been moved away from the heads 149 through 152 is made into contact with them.

Figure 14:
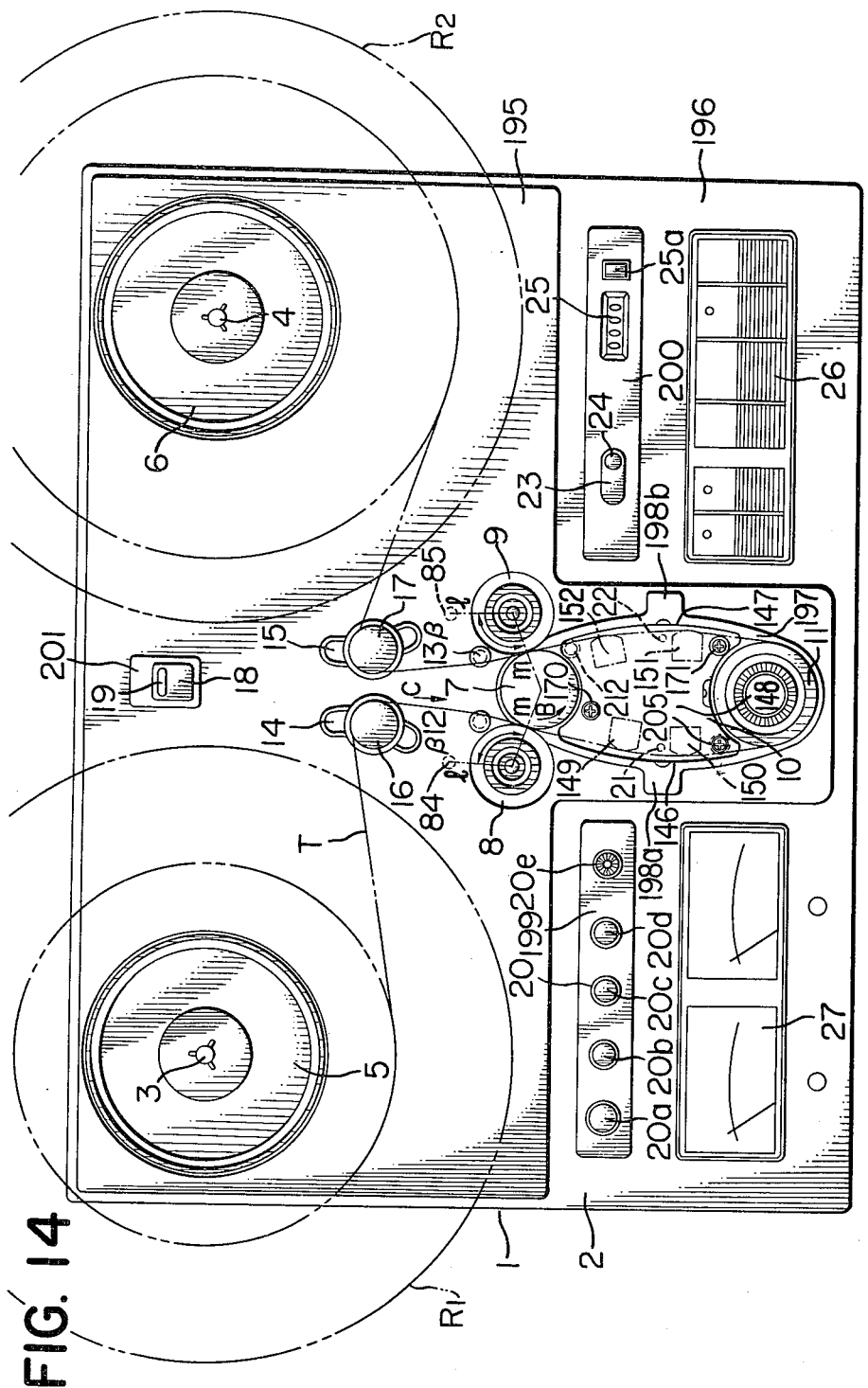
FIG. 14 is a front view illustrating the recording and reproducing device in playback mode.

A very small voltage is impressed to the reel motor 28 on the side of the supply reel so that the back tension may be applied to the tape T while the reel motor 29 is driven to rotate the take-up reel $R_2$ to take-up the tape T. The capstan motor 134 is driven to rotate the capstan 7 in the direction B in FIG. 14 so that the tape T is transported in the direction indicated by the arrow C, whereby the playback is started. The height of the tape during the transport is first determined by the flanges (not shown) of the tension roller 16 and then the height of the tape transported to the nip between the capstan 7 and the pinch roller 8 is controlled by the tape guide portion 12a of the tape guide 12. After passing over the heads 149 and 150, the tape passes over the guide portion 211 of the column 205 so that the height of tape T to be wrapped around the roller 11 is determined. Thereafter the tape is made to pass over the guide portion 213 of the tape guide pin 212 so that the height of the tape to be transported to the nip between the capstan 7 and the pinch roller 9 is determined, and then the tape is passed over the tape guide portion 13a of the tape guide pin 13 and the flanges 71 and 72 of the tension roller 17 determine the height of the tape to be rewound around the take-up reel $R_2$. Therefore the tape is smoothly transported at a predetermined height with the tension which displaces the tension rollers 17 and 17 to the mid-points of the elongated slots 14 and 15 as shown in FIG. 14.

In the playback mode, the pressure under which the tape is pressed against the head 149, 150, 151 or 152 is controlled by controlling the tape tension in a manner to be described below.

The two pinch rollers 8 and 9 are symmetrical about the line connecting between the centers of the capstan 7 and roller 11, and the points of contact between the pinch rollers 8 and 9 and the capstan 7 are also symmetrical about said line. In addition, the pinch rollers 8 and 9 are pressed against the capstan 7 from the above. Furthermore the line l connecting between axes of the shafts 84 and 85 about which are rotated the pinch roller levers 86 and 87, respectively, and the centers of the pinch rollers 8 and 9 and the line m interconnecting between the center of the pinch roller 8 or 9 and the center of the capstan 7 makes an angle $\beta$ which is an obtuse angle.

Therefore, the pinch roller 8 is rotated in the direction in which the pinch roller 8 is released from the direction B of rotation of the capstan 7 while the pinch roller 9 is rotated in the direction in which the pinch roller 9 is caught or pulled by the capstan 7 so that the pinch roller 9 is rotated together with the capstan 7 without almost no slip therebetween, but the pinch roller 8 rotates together with the capstan 7 with a certain slip. Therefore, the transport speed of the tape T passing through the nip between the capstan 7 and the pinch roller 9 is faster than the speed of the tape passing through the nip between the capstan 7 and the pinch roller 8 so that the tape T is imparted with a predetermined tension between the two driving points or the points of contact between the capstan on the one hand and the pinch rollers 8 and 9 on the other hand. Thus the positive pressure contact of the tape against the heads 149 through 152 may be ensured during the transportation.

The tape T is wrapped around the roller 11 through a relatively greater angle of 180° with a predetermined tension so that the roller 11 may rotate without any slip relative to the tape T. Therefore, the roller 11 rotates in correct synchronism with the transport of the tape T so that the tape counter 25 may indicate a correct length of the tape transported. In addition the tape counter 25 may display a correct tape transport time because the rotational speed of the roller is constant regardless of the amounts of the tape wound around both the reels $R_1$ and $R_2$.

Figure 17:
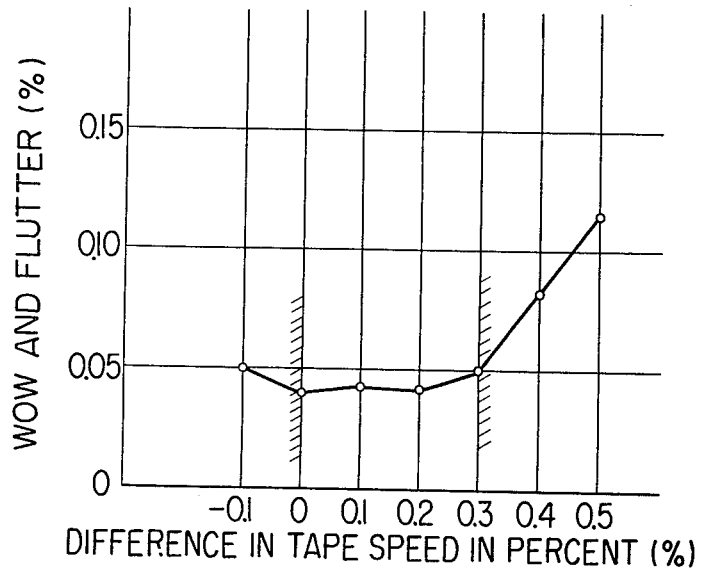
FIG. 17 is a graph showing the relation between wow and flutter and the difference in tape speed in %.

The tension produced by the capstan 7 and the pinch rollers 8 and 9 and imparted to the tape T will be described in more detail. First the relation between the pressure with which the pinch roller is pressed against the capstan and the speed of tape will be considered. For instance, with a pressure 1 kg as a reference pressure, the pinch roller pressure was varied to see the variation in tape transport speed. The result is shown in FIG. 15. The relation between the difference in tape transport speed, which is produced in the manner described above, and wow and flutter produced from the tape T between the heads 149 and 152 was also investigated, and the result is shown in FIG. 17. The tape transport speed produced between the capstan 7 and the pinch roller 9 is taken as a reference speed. When the tape transport speed is increased so that the difference in speed approaches about 0.3%, wow and flutter are suddenly increased so that high performance cannot be expected.

To improve wow and flutter, the difference in speed may be negatively increased. Then the tape speed imparted by the capstan 7 and the pinch roller 8 is selected to be faster than the tape speed imparted to the tape by the capstan 7 and the pinch roller 9. In this case, the tape may be transported without any slip, but is unstable even though a small tension may be obtained from the back tensions exerted to the reels $R_1$ and $R_2$ and the tape widning force. Therefore, the problems such as variation in level may occur so that the negative speed difference cannot be employed in practice.

In view of the above, the present invention determines the ratio between the speed produced by the capstan 7 and the pinch roller 8 which rotates in the direction in which the roller 8 may be released from the capstan 7 and the speed produced by the capstan 7 and the pinch roller 9 which rotates in the direction in which the roller 9 is caught by the capstan 7 as follows:

$$1 \geq n \geq 0.997$$

where n = ratio.

As described above, a first and second tape drives are provided by making two pinch rollers pressed against a single capstan; the tape between the first and second tape drives is made into contact with heads; and the speed imparted to the tape at the first tape drive is selected to be faster than the speed imparted to the tape at the second tape drive in such a way that the ratio n therebetween be $$0.997 \leq n \leq 1.$$

Because of the two tape drives, the tape is influenced only by the rotation of the single capstan so that a constant tape transport speed may be ensured. In addition, the variation in tape transport speed may be minimized. Since $0.997 \leq n \leq 1$, wow and flutter between the two tape drives may be minimized. Therefore, as a whole, an excellent constant tape speed characteristic may be ensured.

When the play mode described above is stopped, the brake releasing solenoid and plunger assemblies 38 and 39 and the solenoid and plunger 103 are de-energized and the reel motors 1 are also de-energized. Therefore, the brake lever 32 and 33 are rotated under the returning forces of the springs 44 and 45 so that the brake shoes 36 and 37 are pressed against the rotors 28a and 29a of the reel motors 28 and 29 and consequently the turntables 5 and 6 are applied with brake. The drive plate 99 is displaced downwardly through the lever 101 under the force of the spring 106 so that the actuating levers 109 and 110 are returned to the initial position. Therefore, the pinch rollers 8 and 9 are moved away from the capstan 7, so that the tape is stopped.

Upon returning of the pinch roller levers 86 and 87 to the initial position, the shifter levers 126 and 127 are rotated against the forces of the springs 130 and 131 so that the shifter pins 21 and 22 are displaced outwardly and consequently the tape T is moved away from the heads 149 through 152 as shown in FIGS. 1 and 2.

Next the fast-forward and rewinding modes will be described. To set into the fast-forward mode with the tape remained threaded, the fast-forward button or the like in the mode selection panel 26 is operated. Then the brake releasing solenoid and plunger assemblies 38 and 39 are energized and the reel motor 29 is driven so that the turn tables 5 and 6 are released and the turntable 6 and hence the take-up reel $R_2$ is rotated by the reel motor 29, whereby the tape is transported at a high speed in the direction C as with the case of the playback mode.

The relatively greater tensions of the tape are imparted to the tape shifter pins 21 and 22, acting on the pinch roller lever 86 or 87 in the direction substantially in line with the line connecting between the projection 132 or 133 of the shifter lever 126 or 127 at the point of contact with the pin 88 or 89 and the shaft 84 or 85 so that the tension levers 126 and 127 are not rotated and consequently the tape T remains moved away from the heads.

To set into the rewind mode, the rewind mode selection button or the like is depressed. Then the brake releasing solenoid and plunger assemblies 38 and 39 as well as the reel motor 38 are energized so that the turntable 5 is rotated in the clockwise direction when viewed from the front so that the tape is transported at a high speed in the direction opposite to the direction C of tape in the fast-forward mode and wound around the supply reel $R_1$.

To stop the fast-forward or rewind mode, the stop button or the like is depressed to de-energize the brake releasing solenoid and plunger assemblies 38 and 39 and the reel motor 29 or 28 so that the brake is applied to the reel motors 29 and 28 and consequently the tape is stopped. In this case, the reel motors 28 and 29 may be temporarily energized in order to electrically stop them.

In the fast-forward or rewind mode, even when the tape T is deviated from the normal tape path due to the slack of the tape T between the reels $R_1$ and $R_2$ or more particularly when the tape T is slacked sufficiently downwardly between the reel $R_1$ and the tension roller 16 or between the reel $R_2$ and the tension roller 17, the tape will not be caught or trapped by the control panel 20, the level meter 27, the tape shifter operating knob 24, the tape counter 25 and the mode selection control panel 26 because the tops of these components are well below the plane of film transport, especially when the tape recorder is used in the vertical position. Therefore, the tape may be easily returned to its normal path only by rotating the reel $R_1$ or $R_2$.

When the tape is slacked below the capstan 7 with the tape recorder in the horizontal position, the tape T is prevented from falling down from the ear sections 198a and 198b of the third front panel surface or section 197 which is very closely spaced apart from the plane of film transport and is raised relative to the first and second front panel sections 195 and 196. Therefore, the tape is deviated only slightly from the plane of film transport so that the operating for returning the tape to the normal path is very simple.

Furthermore, the first front panel section 195 upon which are disposed the reels $R_1$ and $R_2$ is raised with respect to the second front panel section 196 so that the gap between the flanges of the reels $R_1$ and $R_2$ and the first front panel surface 195 is very small. Therefore, even when the tape is slacked, it may be prevented from being trapped in such gaps.

When the shifter pin operating knob 34 is displaced to the left in FIG. 1 in the fast-forward or rewind mode, the sliding lever 136 is displaced to the left against the spring 141 so that the elastic plate 143 is rotated in the counterclockwise direction in FIG. 2 against the spring 96 to displace the pinch roller 9 toward the capstan 7.

Upon rotation of the pinch roller lever 87, the shifter lever 127 is released and rotated in the counterclockwise direction in FIG. 2 under the returning force of the spring 131 so that the tape shifter pin 22 is displaced inwardly to make the tape into contact with the heads 151 and 152.

The tape shifter pin 22 remains in this position because the leading end of the locking member 142 of the sliding lever 136 remains in engagement with the edge of the hole 140 of the angle 139. In this state, the pinch roller 9 is not pressed against the capstan 7 so that the fast-forward or rewind of the tape is not adversely affected at all.

When the tape is made into contact with the heads 151 and 152 in the fast-forward or rewind mode, the playback is effected at a high speed. This mode of operation is very advantageous in that the cue or review operation may be provided for easily and quickly detecting the position of tapte from which the recording was made.

In the cue and review operations, the pinch roller 8 and the tape shifter pin 21 are in the initial position and the tape T is transported without making into contact with the heads 149 and 150.

The tape shifter pin is released or returned to the initial position when the operating knob 24 is pushed down against the spring 141. More particularly when the operating knob 24 is depressed, the one end 136b of the sliding lever 136 is rotated backwardly to release the locking member 142 so that the sliding lever 136 is returned to the initial position under the force of the spring 141. As a result, the pinch roller lever 87 and the shifter lever 127 are also returned to the initial position so that the tape shifter pin 22 is displaced outwardly and the tape T is moved away from the heads 151 and 152.

The tape T may be made into contact with the heads 151 and 152 even when the tape is not transported. Therefore, one rotates slightly the reels $R_1$ or $R_2$ in either direction while monitoring through the head 152 in order to detect the position at which the recording was started or the spliced position.

In the fast-forward or rewind mode the tape T is wrapped around the roller 11 substantially through 180° so that the rotation of the roller 11 positively follows or is in correct synchronism with the transport of tape. Since the roller 11 is formed with the groove 148, the air trapped between the roller 11 and the tape T may escape through these grooves 184 so that the formation of an air layer between the roller and the tape which causes the slip of tape may be prevented. Therefore, the rotation of the roller 11 positively follows the transport of film and the tape counter 25 therefore can correctly display the length or time the film has been transported. Only one or a plurality of grooves 184 may be provided. The same is true for the tension rollers.

When a relatively large tension is exerted to the tape T in the non-play or stop mode, the tension rollers 16 and 17 will react in a manner to be described below. As shown in FIG. 2, when the tension roller 16 or 17 is in the lowermost position in the elongated slot 14 or 15, the spring 68 or 69 for biasing the tension lever 60 or 61 and the line connecting the axis of the shaft 62 or 63 and the position at which the spring 86 or 69 is engaged with the tension lever 60 or 61 makes an angle substantially equal to 90°. Therefore, when the tension lever 60 or 61 is rotated in the counterclockwise or clockwise direction from the position shown in FIG. 2 the force exerted from the spring to the lever 60 or 61 is gradually accelerated, and when the lever 61 or 62 is rotated to the extreme opposite position, the distance between the shaft 62 or 63 and the point of action of the spring 68 or 69 becomes maximum. Thus the rotary load moment of the tension roller 16 or 17 is acceleratingly increased as the tension roller 16 or 17 is displaced downwardly in the elongated slot 14 or 15. Therefore, the greater variation in tension exerted to the tape may be taken up by the tension rollers 16 and 17 which are displaced only over a relatively small range.

What is claimed is:

1. A magnetic recording and reproducing device of the type wherein the tape is transported from one reel mounted on one spindle to the other reel mounted on the other spindle through a tape drive means and a head block so that recording, playback, fast-forward or rewind may be effected, comprising:
    (a) a capstan of constant diameter which rotates at a predetermined constant speed,
    (b) a rotatable roller,
    (c) a pair of identical pinch rollers of constant diameter which are disposed symmetrical about the bisector or perpendicular erected at the mid-point of a line connecting the centers of said capstan and rotatable roller and which are selectively pressed against said capstan from the opposite directions, the lines of contact between the pinch rollers and capstan being symmetrically located such that the angle formed between (i) a line connecting the centers of a pinch roller and the capstan and (ii) a line connecting the centers of the capstan and idler roller forms an obtuse angle,
    (d) spring means for urging said pinch rollers against opposite sides of said capstan with equal force and pressure, so that one pinch roller is caught by the capstan and the other pinch roller releases from the capstan and exhibits a predetermined slip with respect thereto,
    (e) a head block disposed between said capstan and said roller and including a plurality of heads,
    (f) a first tape drive provided by said capstan and one of said pinch rollers and a second tape drive provided by said capstan and the other pinch roller,
    (g) the tape transported by said first tape drive being directed toward said roller, where said tape is redirected toward said second tape drive which drives said tape toward said the other reel,
    (h) said tape being brought into contact with the heads in said head block between said first and second tape drives, and
    (i) the speed imparted to said tape from said first tape drive being slower than the speed imparted to said tape from said second tape drive so that the ratio n between them may be $$0.997 \leq n \leq 1.$$

2. A magnetic recording and reproducing device as set forth in claim 1, further comprising:
    (a) a first tape position control member for controlling the height of said tape immediately before said tape is fed to said first tape drive,
    (b) a second tape position control member for controlling the height of said tape immediately before it is wrapped partly around said roller,
    (c) a third tape position control member for controlling the height of said tape immediately before it is fed into said second tape drive, and
    (d) said roller being free from controlling the height ofs said tape being transported.

3. A magnetic recording and reproducing device as set forth in claim 1, wherein said head block includes a head block base mounted in coplanar relation with said capstan and said roller and a plurality of heads mounted on the undersurface of said head block base, said tape transported by said capstan and one of said pinch rollers is wrapped substantially through 180° around said roller to be directed toward said capstan and the other pinch roller which cooperate to transport said tape further, said heads of said head block are so arranged that they are made into contact with said tape from the inside so that said tape may be transported along a substantially arcuate path between said capstan and one pinch roller and said capstan and the other pinch roller, the upper and lower sides of said head block base are so curved that they may be spaced apart from said capstan and said roller by a very close distance, and the lateral sides of said head block base are so arcuated that they may slightly cover said arcuate path of said tape.

4. A magnetic recording and reproducing device as set forth in claim 1, further comprising:
   (a) rotatable pinch roller lever each for supporting a pinch roller so as to move it toward and press it against said capstan or to move said pinch roller away from said capstan,
   (b) means for holding the pinch rollers in the position moved away from said capstan in the non-play mode,
   (c) tape shifter pins each for moving said tape toward and press it against said heads or move said tape away from said heads,
   (d) rotatable shifter levers each for supporting the tape shifter pin,
   (e) springs each for biasing the shifter lever so as to retract the shifter pin, thereby making said tape into contact with said heads,
   (f) engaging means each formed integral with each of said pinch roller levers for rotating the shifter lever against the spring so as to displace the shifter pin, thereby removing said tape from said heads when said pinch rollers are moved away from said capstan by said pinch roller holding means,
   (g) control means for rotating said pinch roller levers so that said pinch rollers which have been spaced apart from said capstan may be displaced to the position where said pinch rollers are almost made into contact with said capstan,
   (h) the direction of the force of the spring exerted to said engaging means through the shifter lever being substantially toward the pivot point of said pinch roller when the shifter lever is being rotated by the pinch roller lever when said pinch rollers are spaced apart from said capstan, whereby when said control means is actuated when said pinch rollers are spaced apart from said capstan or when the magnetic recording and reproducing device is set into the playback mode, said pinch roller levers are released and rotated under the returning forces of said springs to retract said tape shifter pins, thereby making said tape into contact with said heads.

5. A magnetic recording and reproducing device as set forth in claim 1, further comprising:
   (a) a pair of tension members which are disposed symmetrically about the bisector of the line connecting between the centers of said reel spindles and which are engageable with said tape,
   (b) two rotatable tension levers for supporting the tension members,
   (c) springs each biasing the tension levers into an initial position with the tension members in contact with the tape,
   (d) one control means which is disposed on the vertical bisector of the line connecting the centers of said reel spindles and which upon actuation causes said tension levers to simultaneously rotate against said bias springs to a displaced position with the tension members speced from the tape, and
   (e) locking means for locking said one control means, whereby said two tension members may be simultaneously displaced and may be locked in the displaced position by said locking means.

6. A magnetic recording and reproducing device as set forth in claim 1, further comprising:
   (a) two tension members which are disposed symmetrical about the bisector of the line connecting between the centers of said reel spindles and which are engageable with said tape,
   (b) two rotatable tension levers, each for supporting the tension member,
   (c) first springs biasing said tension levers into an initial position with the tension members in contact with the tape,
   (d) one control means disposed on said bisector and movable in one direction of said bisector for simultaneously displacing said two tension levers against said first bias springs to a displaced position with the tension members speced from the tape,
   (e) second bias springs for biasing said one control means in the direction perpendicular to said bisector, and
   (f) locking means for locking said one control means under the force of said second spring, whereby when said one control means is operated in said first direction said two tension members are simultaneously displaced and locked in the displaced position by said locking means, and when said one control means is operated in a second direction against said second bias spring, said tension members are released from said locking means and returned to the initial position.

7. A magnetic recording and reproducing device as set forth in claim 1, further comprising a roller which is disposed adjacent to the tape transport path for rotation in synchronism with the transport of tape for guiding said tape and is formed with at least one circumferential groove arounds which is wrapped said tape through a predetermined angle.

* * * * *

UNITED STATES PATENT OFFICE
CERTIFICATE OF CORRECTION

Patent No. 4,133,012　　　　　　　　Dated January 2, 1979

Inventor(s) Robert S. Tupper

It is certified that error appears in the above-identified patent and that said Letters Patent are hereby corrected as shown below:

Column 1, last line: "of a plurality heads" should be -- of a plurality of heads --.

Column 3, line 11: "elongaged" should be --elongated--.

Column 6, lines 1-2: "dimmensional" should be --dimensional--.

Column 7, line 9: "slight" should be --slightly--.

line 67: After "tape" insert --which--.

Column 8, line 31: After "between" delete "a".

line 32: After "183a" insert --and--.

line 66: Delete "are".

Column 13, line 9: "widning" should be --widening--.

line 45: "lever" should be --levers--.

Column 15, line 17: "tapte" should be --tape--.

Column 16, line 68: "ofs" should be --of--.

Column 17, line 56: After "when" insert --(i)--.

UNITED STATES PATENT OFFICE
CERTIFICATE OF CORRECTION

Patent No. 4,133,012      Dated January 2, 1979

Inventor(s) Robert S. Tupper

It is certified that error appears in the above-identified patent and that said Letters Patent are hereby corrected as shown below:

Column 17, line 57: "or" should be --and--; after "when" insert --(ii)--.

line 60: "under the returning" should be --by the restoring--.

Column 18, line 2: "making" should be --bringing--.

line 58: "arounds" should be --around--.

Signed and Sealed this

Fourth Day of September 1979

[SEAL]

Attest:

LUTRELLE F. PARKER

Attesting Officer     Acting Commissioner of Patents and Trademarks

UNITED STATES PATENT AND TRADEMARK OFFICE
CERTIFICATE OF CORRECTION

PATENT NO. : 4,133,012
DATED : January 2, 1979
INVENTOR(S) : Takehisa Takamiya, et al It is certified that error appears in the above—identified patent and that said Letters Patent is hereby corrected as shown below:

Column 1, last line: "of a plurality heads" should be --of a plurality of heads--.

Column 3, line 11: "elongaged" should be --elongated--.

Column 6, lines 1-2: "dimmensional" should be --dimensional--.

Column 7, line 9: "slight" should be --slightly--.

line 67: After "tape" insert --which--.

Column 8, line 31: After "between" delete "a".

line 32: After "183a" insert --and--.

line 66: Delete "are".

Column 13, line 9: "widning" should be --widening--.

line 45: "lever" should be --levers--.

Column 15, line 17: "tapte" should be --tape--.

Column 16, line 68: "ofs" should be --of--.

Column 17, line 56: After "when" insert --(i)--.

UNITED STATES PATENT AND TRADEMARK OFFICE
CERTIFICATE OF CORRECTION

PATENT NO. : 4,133,012
DATED : January 2, 1979
INVENTOR(S) : Takehisa Takamiya, et al It is certified that error appears in the above—identified patent and that said Letters Patent is hereby corrected as shown below:

Column 17, line 57: "or" should be --and--; after "when" insert --(ii)--.

line 60: "under the returning" should be --by the restoring--.

Column 18, line 2: "making" should be --bringing--.

line 58: "arounds" should be --around--.

THIS CERTIFICATE SUPERSEDES CERTIFICATE OF CORRECTION ISSUED September 4, 1979.

Signed and Sealed this

Twenty-sixth Day of February 1980

[SEAL]

Attest:

SIDNEY A. DIAMOND

Attesting Officer     Commissioner of Patents and Trademarks